United States Patent
Zhao et al.

(10) Patent No.: US 12,116,525 B2
(45) Date of Patent: Oct. 15, 2024

(54) LOW-DENSITY TREATMENT FLUID AND METHODS FOR TREATING THIEF ZONES LOCATED ABOVE PAY ZONES

(71) Applicant: Saudi Arabian Oil Company, Dhahran (SA)

(72) Inventors: Weishu Zhao, Dhahran (SA); Jin Huang, Dhahran (SA); Feng Liang, Cypress, TX (US); Wengang Li, Khobar (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/010,236

(22) PCT Filed: Jun. 28, 2021

(86) PCT No.: PCT/US2021/039362
§ 371 (c)(1),
(2) Date: Dec. 14, 2022

(87) PCT Pub. No.: WO2022/005962
PCT Pub. Date: Jan. 6, 2022

(65) Prior Publication Data
US 2023/0265333 A1 Aug. 24, 2023

Related U.S. Application Data

(60) Provisional application No. 63/045,312, filed on Jun. 29, 2020.

(51) Int. Cl.
*E21B 43/32* (2006.01)
*C09K 8/504* (2006.01)
*C09K 8/512* (2006.01)

(52) U.S. Cl.
CPC ............ *C09K 8/5045* (2013.01); *C09K 8/512* (2013.01); *E21B 43/32* (2013.01)

(58) Field of Classification Search
None
See application file for complete search history.

(56) References Cited

U.S. PATENT DOCUMENTS

| | | | | |
|---|---|---|---|---|
| 4,817,720 A | * | 4/1989 | Friedman | C09K 8/82 166/295 |
| 9,969,923 B2 | | 5/2018 | Reddy et al. | |

(Continued)

FOREIGN PATENT DOCUMENTS

WO 2015116044 A1 8/2015

OTHER PUBLICATIONS

Bailey et al., "Water Control", Oilfield Review, pp. 30-51, Spring 2000.

(Continued)

*Primary Examiner* — Andrew Sue-Ako
(74) *Attorney, Agent, or Firm* — DINSMORE & SHOHL LLP

(57) ABSTRACT

In accordance with one or more embodiments of the present disclosure, a low-density treatment fluid includes a base water-control system and at least one light-weight filler material. The base water-control system may include an inorganic material system comprising an aqueous colloidal silica and a water-soluble chemical activator for gelling the colloidal silica, or the base water-control system may include an organic material system comprising of polymeric material. The low-density treatment fluid may have a density of from 0.1 g/cm³ to 0.75 g/cm³. Also described are methods of recovering a target fluid from a subterranean cavity using such a low-density treatment fluid.

17 Claims, 4 Drawing Sheets

(56) References Cited

U.S. PATENT DOCUMENTS

| | | | |
|---|---|---|---|
| 10,655,049 B1 | 5/2020 | Wagle et al. | |
| 10,655,050 B1 | 5/2020 | Wagle et al. | |
| 2004/0262003 A1* | 12/2004 | Nguyen | C09K 8/44 |
| | | | 507/236 |
| 2010/0224366 A1* | 9/2010 | Lende | C04B 28/02 |
| | | | 166/292 |
| 2013/0292120 A1* | 11/2013 | Patil | E21B 33/13 |
| | | | 166/293 |
| 2014/0174739 A1* | 6/2014 | Bourcier | E21B 33/13 |
| | | | 166/292 |
| 2016/0356118 A1* | 12/2016 | Schmidt | E21B 43/283 |
| 2018/0346793 A1* | 12/2018 | Al-Zoraia | C09K 8/536 |

OTHER PUBLICATIONS

International Search Report and Written Opinion pertaining to Application No. PCT/US2021/039362 dated Oct. 15, 2021, 15 pages.

* cited by examiner

LOW-DENSITY TREATMENT FLUID AND METHODS FOR TREATING THIEF ZONES LOCATED ABOVE PAY ZONES

CROSS-REFERENCE TO RELATED APPLICATION

This application is a §371 National Stage Application of International Application Serial No. PCT/US2021/039362, filed Jun. 28, 2021, and claims priority to U.S. Provisional Application Ser. No. 63/045,312 filed Jun. 29, 2020, the entire disclosures of which is are incorporated herein by reference.

BACKGROUND

Field

The present disclosure relates to hydrocarbon recovery from subterranean reservoirs and, more specifically, to low-density treatment fluids that can be used to treat thief zones located above pay zones in such subterranean reservoirs.

Background

As shown in FIG. 1, fractures 2 and faults 4 may span hydrocarbon reservoirs 6 ("pay zones") and water zones 8 above these hydrocarbon reservoirs 6. As a result, water may be produced with the hydrocarbon during the extraction procedure. Water production management remains one of the major challenges when accessing hydrocarbons from subterranean reservoirs. The strategies of controlling unwanted water production depend on water sources and production mechanisms. Many chemical options have been devised for mitigating excessive water production problems, including polymer gels, relative permeability modifying polymers, inorganic gels, and monomer systems. The fractures 2 and faults 4 are referred to as "thief zones." It is challenging to achieve complete water shutoff with traditional treatment fluids when thief zones are located above pay zones, because of the unfavorable density differential between the water, hydrocarbon, and treatment fluid.

BRIEF SUMMARY

Therefore, a more effective treatment fluid is needed for drilling or production environments in which one or more thief zones are located above the pay zone.

It has been discovered that a low-density treatment fluid introduced into a target zone allows for deeper penetration (relative to conventional treatment fluid) into water production fractures and faults (collectively "thief zones"). The present disclosure is directed to low-density treatment fluids and methods of recovering hydrocarbons using such low-density treatment fluids.

In accordance with one or more embodiments of the present disclosure, a low-density treatment fluid includes a base water-control system and at least one light-weight filler material. The base water-control system includes colloidal silica and an activator. The low-density treatment fluid has a density of from 0.1 g/cm$^3$ to 0.75 g/cm$^3$.

In accordance with one or more embodiments of the present disclosure, a low-density treatment fluid includes a base water-control system and at least one light-weight filler material. The base water-control system includes at least one polymeric material. The low-density treatment fluid has a density of from 0.1 g/cm$^3$ to 0.75 g/cm$^3$.

In accordance with one or more embodiments of the present disclosure, a method includes introducing a low-density treatment fluid into a subterranean cavity having at least one pay zone comprising a target fluid and at least one thief zone comprising a secondary fluid, the at least one thief zone being situated between a ground-level opening of the subterranean cavity and the pay zone; allowing the low-density treatment fluid to displace at least a portion of the secondary fluid present in the subterranean cavity; and allowing the low-density treatment fluid to at least partially plug the at least one thief zone.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

DETAILED DESCRIPTION

Figure 1B:
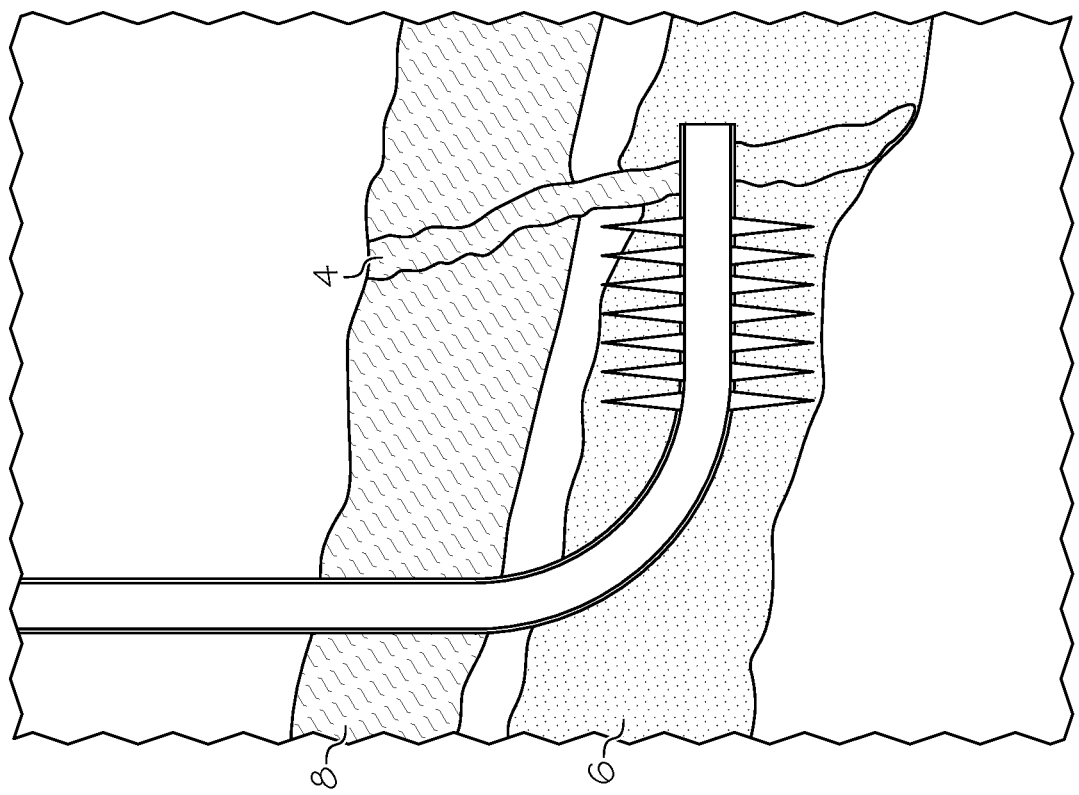
FIG. 1B is a diagram of faults in a wellbore during hydrocarbon extraction operations.
Figure 1A:
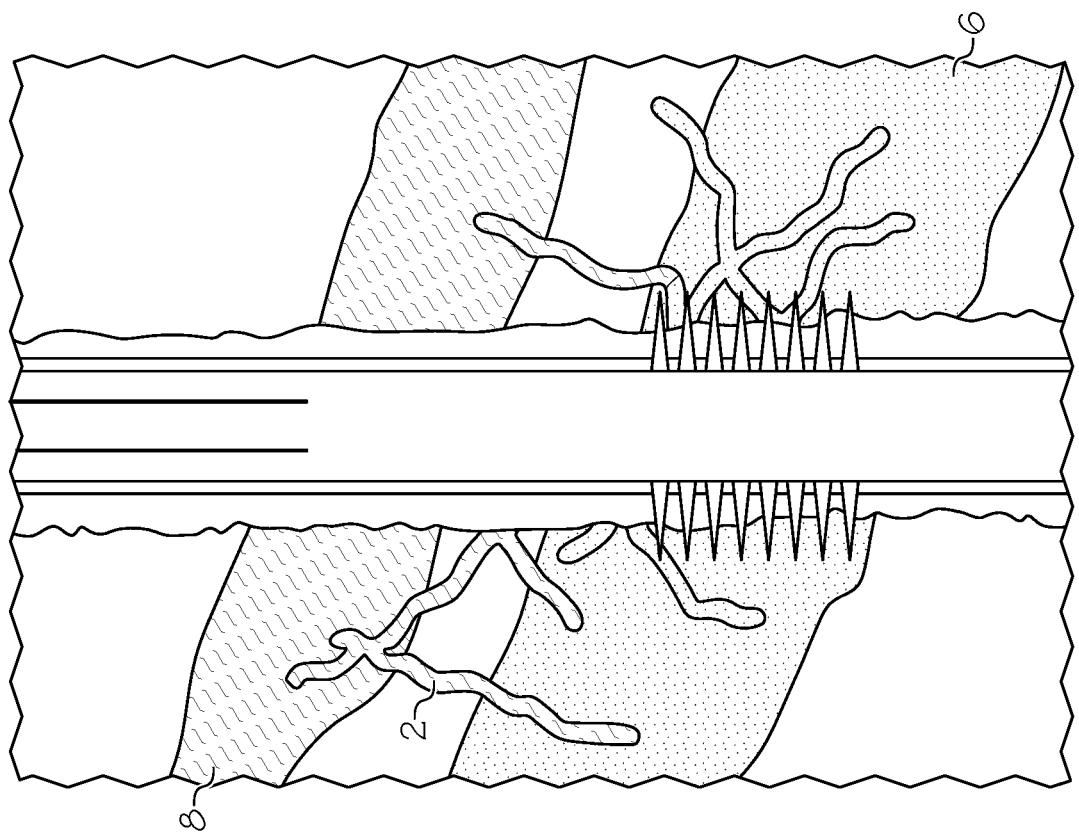
FIG. 1A is a diagram of fractures in a wellbore during hydrocarbon extraction operations.

Embodiments of the present disclosure are directed to low-density treatment fluids that may be suitable for use in hydrocarbon recovery from deposit reservoirs. Additional embodiments, of the present disclosure are further directed to methods of using such low-density treatment fluids for hydrocarbon recovery from deposit reservoirs.

According to one or more embodiments of the present disclosure, a low-density treatment fluid that may be suitable for use in hydrocarbon recovery is provided. The low-density treatment fluid may include a base water-control system and at least one light-weight filler material. In embodiments, the base water-control system may include an inorganic material system comprising an aqueous colloidal silica and a water-soluble chemical activator for gelling the colloidal silica. In embodiments, the base water-control system may include an organic material system comprising of polymeric material. The low-density treatment fluid may have a density of from 0.1 g/cm$^3$ to 0.75 g/cm$^3$.

According to embodiments, a low-density treatment fluid includes: (1) a base water-control system that includes colloidal silica and a water-soluble chemical activator; and (2) at least one light-weight filler material. The low-density treatment fluid has a density of from 0.1 g/cm$^3$ to 0.75 g/cm$^3$.

In one or more embodiments, the base water-control system comprises from 30% to 95% by weight (hereinafter "weight %" or "wt. %") of the low-density treatment fluid.

For instance, the base water-control system may comprise from 35 wt. % to 90 wt. %, from 40 wt. % to 85 wt. %, from 45 wt. % to 80 wt. %, from 50 wt. % to 75 wt. %, from 55 wt. % to 70 wt. %, or even from 60 wt. % to 65 wt. % of the low-density treatment fluid. It should be understood that the concentration of the base water-control system may be within a range formed from any one of the lower bounds of concentration and any one of the upper bounds of concentration described herein.

In one or more embodiments, the at least one light-weight filler material comprises from 5 wt. % to 70 wt. % of the low-density treatment fluid. For instance, the at least one light-weight filler material may comprise from 10 wt. % to 65 wt. %, from 15 wt. % to 60 wt. %, from 20 wt. % to 55 wt. %, from 25 wt. % to 50 wt. %, from 30 wt. % to 45 wt. %, or even from 35 wt. % to 40 wt. % of the low-density treatment fluid. It should be understood that the concentration of the at least one light-weight filler material may be within a range formed from any one of the lower bounds of concentration and any one of the upper bounds of concentration described herein.

In one or more embodiments, the base water-control system may include an inorganic material comprising an aqueous colloidal silica and a water-soluble chemical activator for gelling the colloidal silica. As used herein, the term "colloidal silica" refers to suspensions of fine amorphous, nonporous, and optionally spherical silica ($SiO_2$) particles in a liquid phase. In embodiments, at least 90% of the silica particulate may be mesoscopic particles or nanoparticles. As used herein, a "mesoscopic particle" is a particle having a particle size in the range of 0.1 μm to 1 μm. As used herein, a "nanoparticle" is a particle having a particle size between 1 nm to 0.1 μm. Colloidal silica is distinct from synthetic silicate. Synthetic silicate refers to simple or complex salts of silicic acids, such as magnesium silicate, sodium magnesium silicate, sodium magnesium silicate tetrasodium pyrophosphate, and the like.

Without intending to be bound by any particular theory, it is believed that colloidal silica is stable and non-gelled prior to the addition of the activator due to the electrical repulsion between the silica particles being similarly charged. The inter-particle repulsion allows the silica particles to remain dispersed throughout the aqueous liquid and not settle out of the liquid. The chemical activator can cause at least a portion of the particles to aggregate and form a network. The network can include long, chain-like strings. The network can also be three-dimensional.

In embodiments, the activator may be any substance that facilitates or causes inter-particle collisions of the particles such that the particles aggregate and siloxane bonds (Si—O—Si) can be formed. In embodiments, the chemical activator may comprise an acid or an acid derivative to decrease the pH of the colloidal silica. In embodiments, the acid or acid derivative may comprise hydrochloric acid, sulfuric acid, acetic acid, lactic acid, formic acid, citric acid, oxalic acid, malic acid, tartaric acid, phytic acid, methylglycinediacetic acid, salicylic acid, ascorbic acid, tannic acid, or a combination of two or more thereof. In embodiments, the chemical activator comprise at least one salt. In embodiments, the salt may be an alkali metal salt, ammonium salt, or magnesium salt, such as sodium chloride, potassium chloride, ammonium chloride, sodium bromide, potassium bromide, ammonium bromide, sodium iodide, potassium iodide, ammonium iodide, calcium chloride, magnesium chloride, calcium bromide, magnesium bromide, sodium nitrate, potassium nitrate, ammonium nitrate, sodium sulfate, potassium sulfate, ammonium sulfate, or a combination of two or more thereof. In embodiments, the activator may comprise both an acid and a salt.

According to embodiments, a low-density treatment fluid includes: (1) a base water-control system that includes an organic material system comprising a polymeric material; and (2) at least one light-weight filler material. The low-density treatment fluid has a density of from 0.1 g/cm³ to 0.75 g/cm³.

In one or more embodiments, the polymeric material of the base water-control system may include a crosslinked water-swellable polymeric material, a crosslinkable polymeric system, or a combination thereof.

Exemplary crosslinked water swellable polymeric materials may include, but are not limited to, a crosslinked elastomer, a crosslinked polyacrylamide-based polymer, a crosslinked polyacrylate-based polymer, a crosslinked polyvinyl alcohol-based polymer, a crosslinked starch polyacrylonitrile graft polymer, a copolymer or terpolymer thereof, or a combination thereof. In embodiments, a crosslinked elastomer may comprise a carboxylated butadiene acrylonitrile-based polymer.

In one or more embodiments, the polymeric material of the base water-control system may include a crosslinkable polymeric system. In embodiments, a crosslinkable polymeric system may include a base polymer and a crosslinker. The base polymer may be selected from a copolymer formed from monomers comprising acrylamide or a salt thereof and acrylic acid or a salt thereof, a terpolymer formed from monomers comprising acrylamide or a salt thereof and acrylic acid or a salt thereof, a tetrapolymer formed from monomers comprising acrylamide and acrylic acid, or a mixture of two or more of the copolymer, terpolymer, and tetrapolymer. The crosslinker may be selected from one or more amine-containing compounds selected from a diamine, a triamine, a tetramine, a polyalkylenimine, a polyalkylene polyamine, and a poly-functional aliphatic amine.

In one or more embodiments, the at least one light-weight filler material comprises a non-deformable, low-density particulate material. Exemplary non-deformable, low-density particulate materials include, but are not limited to, hollow glass microspheres, encapsulated volatile organic fluid, or mixtures thereof. In one or more embodiments, the low-density treatment fluid comprises less than or equal to 0.5 wt. % synthetic silicates. In one more embodiments, the low-density treatment fluid comprises substantially no synthetic silicates. In one or more embodiments, the low-density treatment fluid is substantially free of synthetic silicates.

In one or more embodiments, the at least one light-weight filler material comprises a deformable, low-density particulate material. Exemplary deformable, low-density particulate materials include, but are not limited to, hollow elastomers, hollow thermoplastics, elastomer-encapsulated blowing agents, thermoplastic-encapsulated blowing agents, or mixtures thereof. In embodiments, the blowing agent comprises volatile organic fluid. Exemplary light-weight filler materials include, but are not limited to, HGS series glass bubbles from 3M™ and the Expancel series low density filler product from AkzoNobel. Exemplary Expancel includes, but is not limited to Expancel DE(T) and Expancel WE, having a density as low as 0.025 g/cm³ depending on the product.

As used herein, the term "light-weight filler material" refers to a filler material having a density of 0.6 g/cm³ or less. For instance, the density of the at least one light-weight filler material may be from 0.025 g/cm³ to 0.6 g/cm³. For instance, the density of the at least one light-weight filler material may be from 0.05 g/cm$^3$ to 0.575 g/cm$^3$, from 0.075 g/cm$^3$ to 0.55 g/cm$^3$, from 0.1 g/cm$^3$ to 0.525 g/cm$^3$, from 0.125 g/cm$^3$ to 0.5 g/cm$^3$, from 0.15 g/cm$^3$ to 0.475 g/cm$^3$, from 0.175 g/cm$^3$ to 0.45 g/cm$^3$, from 0.2 g/cm$^3$ to 0.425 g/cm$^3$, from 0.225 g/cm$^3$ to 0.4 g/cm$^3$, from 0.25 g/cm$^3$ to 0.375 g/cm$^3$, from 0.275 g/cm$^3$ to 0.35 g/cm$^3$, or even from 0.3 g/cm$^3$ to 0.325 g/cm$^3$. It should be understood that the density of the at least one light-weight filler material may be within a range formed from any one of the lower bounds of density and any one of the upper bounds of density described herein.

In one or more embodiments, the low-density treatment fluid may include one or more additives. Exemplary additives include, but are not limited to, carbon black, fly ash, carbon fibers, polyester particles, and polyester fibers.

In one or more embodiments, the low-density treatment fluid may have a density of from 0.1 g/cm$^3$ to 0.75 g/cm$^3$, or from 0.2 g/cm$^3$ to 0.7 g/cm$^3$, or from 0.3 g/cm$^3$ to 0.6 g/cm$^3$, or from 0.4 g/cm$^3$ to 0.5 g/cm$^3$. That is, the low-density treatment fluid may have a density of 0.1 g/cm$^3$, 0.15 g/cm$^3$, 0.2 g/cm$^3$, 0.25 g/cm$^3$, 0.3 g/cm$^3$, 0.35 g/cm$^3$, 0.4 g/cm$^3$, 0.45 g/cm$^3$, 0.5 g/cm$^3$, 0.55 g/cm$^3$, 0.6 g/cm$^3$, 0.65 g/cm$^3$, 0.7 g/cm$^3$, 0.75 g/cm$^3$, or any fractional part thereof. It should be understood that the density of the low-density treatment fluid may be within a range formed from any one of the lower bounds of density and any one of the upper bounds of density described herein. For instance, and without limitation, the density of the low-density treatment fluid may be within the range of from 0.1 g/cm$^3$ to 0.5 g/cm$^3$ or from 0.1 g/cm$^3$ to 0.45 g/cm$^3$ or from 0.2 g/cm$^3$ to 0.5 g/cm$^3$ or from 0.2 g/cm$^3$ to 0.45 g/cm$^3$ or from 0.2 g/cm$^3$ to 0.4 g/cm$^3$ or even from 0.1 g/cm$^3$ to 0.4 g/cm$^3$.

The density of the low-density treatment fluid may be adjusted based on the concentration of the light-weight filler material added to the low-density treatment fluid. As a higher percentage of light-weight filler material is added, the density will decrease. For example, in one embodiment, HGS-16 hollow glass spheres having a density of 0.17 g/cm$^3$ may be combined in a concentration of 30 wt. % in the base water control system, which has density of 1.0 g/cm$^3$. The resulting low-density treatment fluid may have a density of 0.406 g/cm$^3$. However, when HGS-16 is present in a lower concentration of 15 wt. %, the density may increase to 0.577 g/cm$^3$.

When in use as seals for thief zones above the pay zone, it may be advantageous to allow the low-density treatment fluid to gel such that the thief zones are obstructed by a semi-solid substance. The low-density treatment fluid may be gelled by applying heat to the low-density treatment fluid. For instance, the low-density treatment fluid may be heated to from 70° C. to 230° C., or from 80° C. to 220° C., or from 90° C. to 210° C., or from 100° C. to 200° C., or from 110° C. to 190° C., or from 120° C. to 180° C., or from 130° C. to 170° C., or from 140° C. to 160° C., or from 145° C. to 155° C. In one or more embodiments, the gelling may occur by heating the low-density treatment fluid in a range from 70° C. to 110° C., or from 80° C. to 100° C., or from 85° C. to 95° C. It should be understood that the gelling temperature of the low-density treatment fluid may be within a range formed from any one of the lower bounds of gelling temperature and any one of the upper bounds of gelling temperature described herein.

In one or more embodiments, a method of hydrocarbon recovery includes introducing a low-density treatment fluid into a subterranean cavity having a target fluid and at least one thief zone including a secondary fluid, allowing the low-density treatment fluid to displace at least a portion of the secondary fluid, and allowing the low-density treatment fluid to at least partially plug the at least one thief zone. In embodiments, the at least one thief zone is situated between a ground-level opening of the subterranean cavity and the pay zone. In one or more embodiments, the target fluid may have a density that is greater than a density of the low-density treatment fluid. In such embodiments, the method may further include allowing the low-density treatment fluid to accumulate on a surface of the target fluid.

In embodiments, the target fluid may be a hydrocarbon or a mixture of hydrocarbons and the secondary fluid may be an aqueous solution. In one or more embodiments, the aqueous solution may include one or more of deionized, tap, distilled, or fresh waters; natural, brackish, or saturated salt waters; natural, salt dome, hydrocarbon formation produced, or synthetic brines; filtered or untreated seawaters; mineral waters; or other potable or non-potable waters containing one or more dissolved salts, minerals, or organic materials. In one or more embodiments, the aqueous solution may comprise at least 80 wt. %, at least 90 wt. %, at least 95 wt. %, at least 99 wt. %, or even at least 99.9 wt. % of water.

In one or more embodiments, at least 90 wt. %, at least 95 wt. %, or even at least 99 wt. % of the aqueous mixture by mass may be a brine solution. As used herein, the term "brine" may refer to a saturated solution of one or more alkali metal chlorides. For example, "brine" may refer to a saturated solution of NaCl, KCl, or mixtures thereof. Alternatively, the term "brine" may refer to naturally derived saltwater, for example, seawater or salt lake water, used in its natural state or after having undergone processing, such as filtration, to remove contaminants and large particles. In one or more embodiments, the aqueous solution may consist of brine.

As used herein, the term "hydrocarbons" refers to substances formed from hydrogen and carbon atoms. Other atoms may also be present, such as oxygen, sulfur, and nitrogen, for example.

As used herein, the term "deposit reservoir" refers to a subsurface pool of hydrocarbons contained in porous or fractured rock formations.

As used herein, the term "borehole" refers to an opening in the ground that provides access to a subsurface reservoir.

According to additional embodiments, a hydrocarbon well may include a subterranean deposit reservoir, a borehole, and a low-density treatment fluid. The low-density treatment fluid may include a base water-control system and at least one light-weight filler material. The base water-control system may include a polymeric material, colloidal silica, or a mixture of the polymeric material and the colloidal silica, as described above. The low-density treatment fluid may have a density of from 0.1 g/cm$^3$ to 0.75 g/cm$^3$.

According to a first aspect, either alone or in combination with any other aspect, a low-density treatment fluid comprises a base water-control system comprising colloidal silica and an activator; and at least one light-weight filler material. The low-density treatment fluid has a density of from 0.1 g/cm$^3$ to 0.75 g/cm$^3$.

According to a second aspect, either alone or in combination with any other aspect, the at least one light-weight filler material comprises a non-deformable, low-density particulate material.

According to a third aspect, either alone or in combination with any other aspect, the non-deformable, low-density particulate material comprises hollow glass microspheres.

According to a fourth aspect, either alone or in combination with any other aspect, the at least one light-weight filler material comprises a deformable, low-density particulate material.

According to a fifth aspect, either alone or in combination with any other aspect, wherein the deformable, low density particulate material is selected from a hollow elastomer, a hollow thermoplastic, an elastomer-encapsulated blowing agent, a thermoplastic-encapsulated blowing agent, and mixtures thereof.

According to a sixth aspect, either alone or in combination with any other aspect, the blowing agent comprises volatile organic fluid.

According to a seventh aspect, either alone or in combination with any other aspect, the activator comprises an acid, an alkali metal salt, or a combination thereof.

According to an eighth aspect, either alone or in combination with any other aspect, the activator comprises an acid selected from the group consisting of hydrochloric acid, sulfuric acid, acetic acid, lactic acid, formic acid, citric acid, oxalic acid, malic acid, tartaric acid, phytic acid, methylglycinediacetic acid, salicylic acid, ascorbic acid, tannic acid.

According to a ninth aspect, either alone or in combination with any other aspect, the activator comprises a salt selected from the group consisting of sodium chloride, potassium chloride, ammonium chloride, sodium bromide, potassium bromide, ammonium bromide, sodium iodide, potassium iodide, ammonium iodide, calcium chloride, magnesium chloride, calcium bromide, magnesium bromide, sodium nitrate, potassium nitrate, ammonium nitrate, sodium sulfate, potassium sulfate, ammonium sulfate.

According to a tenth aspect, either alone or in combination with any other aspect, a low-density treatment fluid comprises a base water-control system comprising at least one polymeric material; and at least one light-weight filler material. The low-density treatment fluid has a density of from 0.1 $g/cm^3$ to 0.75 $g/cm^3$.

According to an eleventh aspect, either alone or in combination with any other aspect, the low-density treatment fluid comprises less than or equal to 0.5 weight % synthetic silicate.

According to a twelfth aspect, either alone or in combination with any other aspect, the at least one polymeric material comprises a crosslinked water-swellable polymeric material.

According to a thirteenth aspect, either alone or in combination with any other aspect, the crosslinked water-swellable polymeric material comprises a crosslinked polyacrylamide-based polymer, a crosslinked polyacrylate-based polymer, a crosslinked polyvinyl alcohol-based polymer, a crosslinked starch polyacrylonitrile graft polymer, a copolymer or terpolymer thereof, or a combination thereof.

According to a fourteenth aspect, either alone or in combination with any other aspect, the crosslinked water-swellable polymeric material is a crosslinked elastomer.

According to a fifteenth aspect, either alone or in combination with any other aspect, the crosslinked elastomer comprises a carboxylated butadiene acrylonitrile-based polymer.

According to a sixteenth aspect, either alone or in combination with any other aspect, the at least one polymeric material comprises a crosslinkable polymeric system.

According to a seventeenth aspect, either alone or in combination with any other aspect, the crosslinkable polymeric system comprises a base polymer selected from a copolymer formed from monomers comprising acrylamide or a salt thereof and acrylic acid or a salt thereof, a terpolymer formed from monomers comprising acrylamide or a salt thereof and acrylic acid or a salt thereof, a tetrapolymer formed from monomers comprising acrylamide and acrylic acid, or a mixture of two or more of the copolymer, terpolymer, and tetrapolymer; and a crosslinker selected from one or more amine-containing compounds selected from a diamine, a triamine, a tetramine, a polyalkylenimine, a polyalkylene polyamine, and a poly-functional aliphatic amine.

According to an eighteenth aspect, either alone or in combination with any other aspect, the at least one light-weight filler material comprises a non-deformable, low-density particulate material.

According to a nineteenth aspect, either alone or in combination with any other aspect, the non-deformable, low-density particulate material comprises hollow glass microspheres.

According to a twentieth aspect, either alone or in combination with any other aspect, the at least one light-weight filler material comprises a deformable, low-density particulate material.

According to a twenty-first aspect, either alone or in combination with any other aspect, the deformable, low-density particulate material is selected from a hollow elastomer, a hollow thermoplastic, an elastomer-encapsulated blowing agent, a thermoplastic-encapsulated blowing agent, and mixtures thereof.

According to a twenty-second aspect, either alone or in combination with any other aspect, the blowing agent comprises volatile organic fluid.

According to a twenty-third aspect, either alone or in combination with any other aspect, the low-density treatment fluid comprises substantially no synthetic silicates.

According to a twenty-fourth aspect, either alone or in combination with any other aspect, a method comprises introducing a low-density treatment fluid into a subterranean cavity having at least one pay zone comprising a target fluid and at least one thief zone comprising a secondary fluid, the at least one thief zone being situated between a ground-level opening of the subterranean cavity and the pay zone; allowing the low-density treatment fluid to displace at least a portion of the secondary fluid present in the subterranean cavity; and allowing the low-density treatment fluid to at least partially plug the at least one thief zone.

According to a twenty-fifth aspect, either alone or in combination with any other aspect, the low-density treatment fluid comprises: a base water-control system comprising at least one polymeric material; and at least one light-weight filler material. The low-density treatment fluid has a density of from 0.1 $g/cm^3$ to 0.75 $g/cm^3$.

According to a twenty-sixth aspect, either alone or in combination with any other aspect, the low-density treatment fluid comprises less than or equal to 0.5 weight % synthetic silicates.

According to a twenty-seventh aspect, either alone or in combination with any other aspect, the low-density treatment fluid comprises: a base water-control system comprising colloidal silica; and at least one light-weight filler material. The low-density treatment fluid has a density of from 0.1 $g/cm^3$ to 0.75 $g/cm^3$.

According to a twenty-eighth aspect, either alone or in combination with any other aspect, the target fluid has a density that is greater than a density of the low-density treatment fluid, the method further comprising allowing the low-density treatment fluid to accumulate on a surface of the target fluid.

According to a twenty-ninth aspect, either alone or in combination with any other aspect, the target fluid comprises hydrocarbons and the secondary fluid comprises water.

According to a thirtieth aspect, either alone or in combination with any other aspect, the secondary fluid comprises an aqueous brine solution.

According to a thirty-first aspect, either alone or in combination with any other aspect, the low-density treatment fluid has a density of from 0.1 g/cm$^3$ to 0.5 g/cm$^3$.

EXAMPLE

Using the embodiments of the present disclosure, treatment fluids were produced that exemplify the attributes presently described. It should be understood that the ensuing Examples are illustrative of one or more embodiments presently disclosed and should not be construed in any way as limiting the appended claims or other portions of the present application.

Materials

CEMBINDER® 17 (Nouryon) is an alkaline, aqueous dispersion of colloidal silica that is approximately 40% solids by weight having a density of 1.3 g/ml. The silica dispersion is sodium stabilized and the amorphous silica particles carry a negative surface charge. The SiO2 particles are discrete, have a smooth, spherical shape, and are present in a wide particle size distribution. The physical appearance of the dispersion is an opalescent liquid, slightly more viscous than water. The chemical was used without any further purification. NaCl was used as an activator.

EXPANCEL® WE (Nouryon) microspheres are wet, expanded, thermoplastic spheroids encapsulating a gas with a total solid content of 15%. EXPANCEL® 921 WE 40 d24 was used in experiments detailed below. The estimated microsphere particle size was 35 μm to 55 μm. The true density of this material is 0.024 g/ml.

Formulation of a Low-Density Treatment Fluid

Figure 2:
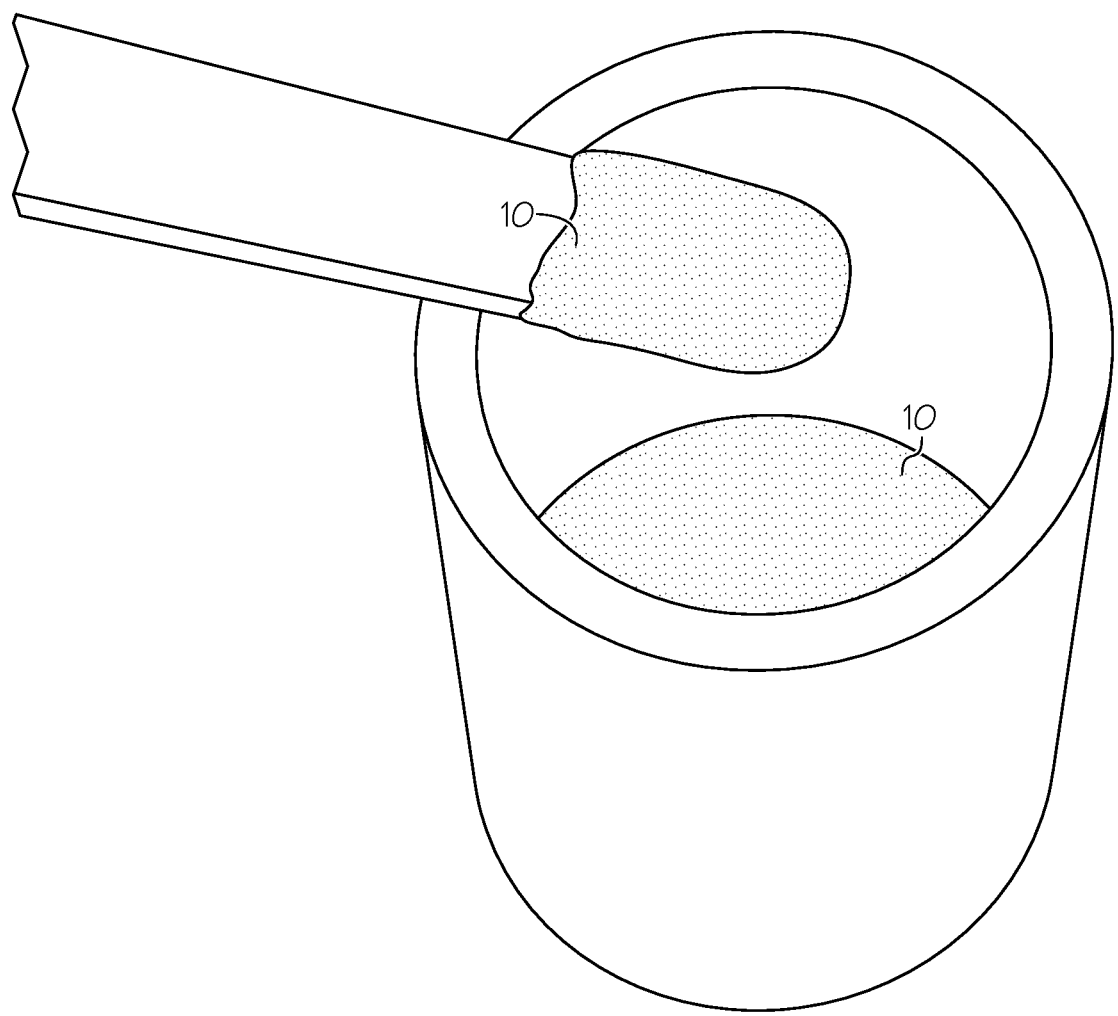
FIG. 2 depicts a low-density treatment fluid produced as described herein.
Figure 3B:
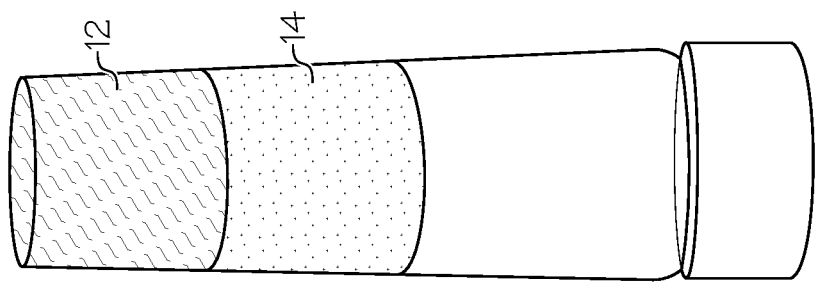
FIG. 3B depicts a low-density treatment fluid, after gelation, located above mineral oil, as described herein.
Figure 3A:
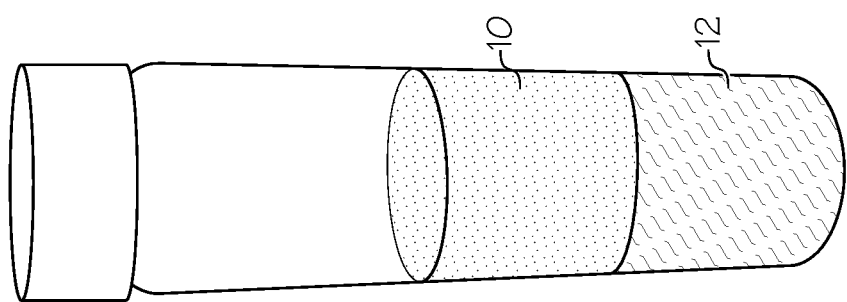
FIG. 3A depicts a low-density treatment fluid, prior to gelation, located above mineral oil, as described herein.

An exemplary treatment fluid was prepared in accordance with one or more embodiments. First, 25 mL 40 wt. % CEMBINDER® 17 colloidal silica was mixed with 25 mL 2 wt. % NaCl in a volume ratio of 1:1. Then, 10 g EXPANCEL® 921 WE 40 d24 microspheres were added, and the resulting mixture was agitated with an overhead stirrer to provide the slurry of treatment fluid 10 shown in FIG. 2. The calculated mixture density was 0.145 g/ml. The mixture was heated to 90° C. and allowed to gel for approximately 5 hours. FIG. 3A shows treatment fluid 10 above mineral oil 12. FIG. 3B shows the same treatment fluid after gelling by heating for 5 hours. The vials of FIG. 3B have been inverted to show that the gelled treatment fluid 14 seals the space above the mineral oil 12, thereby restricting movement of the mineral oil 12.

Wellbore Simulation

Figure 4:
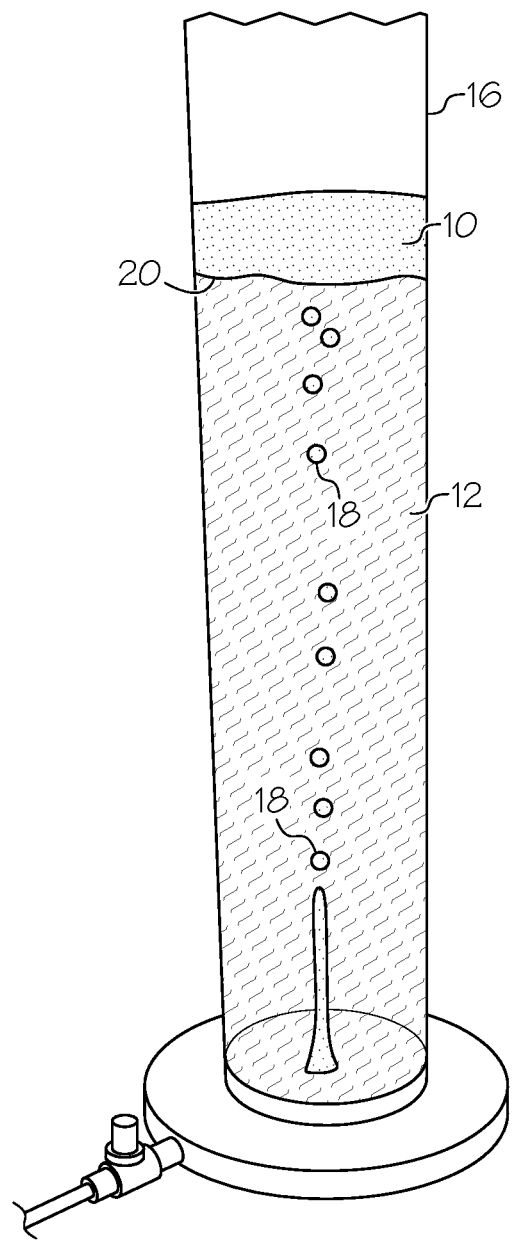
FIG. 4 depicts a wellbore simulator containing mineral oil and a low-density treatment fluid, as described herein.

To examine the pumpability of the low-density treatment fluid, a wellbore simulator 16, as shown in FIG. 4, was charged with mineral oil with a density of 0.8 g/mL. The wellbore simulator 16 was made with 6-inch inner diameter PVC pipe with a height of 16 inches. The wellbore simulator 16 has ¼-inch inner diameter and a 3-inch in height nozzle at the bottom of the wellbore simulator 16 to allow the fluid flow into the wellbore simulator 16. The wellbore simulator 16 was filled with 10 liters of mineral oil. Then, the exemplary pre-mixed treatment fluid 10, formulated as described above, was pumped through the bottom of the wellbore simulator 16. Droplets 18 of the pre-mixed treatment fluid 10 were observed to travel upwards and accumulate on the surface 20 of the mineral oil 12, indicating that the low-density treatment fluid has a lower density than the mineral oil 12. In a production well, this lower density treatment fluid would accumulate above the produced oil and seal thief zones.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

It is noted that one or more of the following claims utilize the term "wherein" as a transitional phrase. For the purposes of defining the present subject matter, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A method for producing hydrocarbons from a production well utilizing a low-density treatment fluid comprising a base water-control system comprising colloidal silica and an activator; and at least one light-weight filler material, the method comprising:

introducing the low-density treatment fluid through the production well into at least one pay zone of a subterranean cavity having the at least one pay zone comprising the hydrocarbons, at least one water zone comprising a secondary fluid, and at least one thief zone comprising a secondary fluid, wherein the at least one water zone is located above the pay zone, the at least one thief zone comprises a fracture, a fault, or both, and the at least one thief zone spans the pay zone and the water zone, such that the water zone is connected to the pay zone through the at least one thief zone;

displacing at least a portion of the secondary fluid present in the at least one pay zone with the low-density treatment fluid;

allowing the low-density treatment fluid to accumulate on a top surface of the hydrocarbons, the hydrocarbons having a density that is greater than a density of the low-density treatment fluid and the low-density treatment fluid having a density of from 0.1 g/cm$^3$ to 0.75 g/cm$^3$;

at least partially plugging the at least one thief zone with the low-density treatment fluid, such that production of the secondary fluid from the at least one water zone through the thief zone to the pay zone is mitigated; and recovering the hydrocarbons from the at least one pay zone through the production well.

2. The method of claim 1, wherein the at least one light-weight filler material comprises a non-deformable, low-density particulate material.

3. The method of claim 1, wherein the at least one light-weight filler material comprises a deformable, low-density particulate material.

4. The method of claim 1, wherein the activator comprises an acid, an alkali metal salt, ammonium salt, magnesium salt, or a combination thereof.

5. The method of claim 1, wherein the activator comprises an acid selected from the group consisting of hydrochloric acid, sulfuric acid, acetic acid, lactic acid, formic acid, citric acid, oxalic acid, malic acid, tartaric acid, phytic acid, methylglycinediacetic acid, salicylic acid, ascorbic acid, tannic acid.

6. The method of claim 1, wherein the activator comprises a salt selected from the group consisting of sodium chloride, potassium chloride, ammonium chloride, sodium bromide, potassium bromide, ammonium bromide, sodium iodide, potassium iodide, ammonium iodide, calcium chloride, magnesium chloride, calcium bromide, magnesium bromide, sodium nitrate, potassium nitrate, ammonium nitrate, sodium sulfate, potassium sulfate, ammonium sulfate.

7. The method of claim 1, wherein at least partially plugging the at least one thief zone with the low-density treatment fluid comprises heating the low-density treatment fluid, such that the low-density treatment fluid gels.

8. The method of claim 7, wherein the low-density treatment fluid is heated to from 70° C. to 230° C.

9. The method of claim 1, wherein:
the at least one light-weight filler material comprises (i) a non-deformable, low-density particulate material, or (ii) a deformable, low-density particulate material; and
the activator comprises (i) an acid selected from the group consisting of hydrochloric acid, sulfuric acid, acetic acid, lactic acid, formic acid, citric acid, oxalic acid, malic acid, tartaric acid, phytic acid, methylglycinediacetic acid, salicylic acid, ascorbic acid, tannic acid, (ii) a salt selected from the group consisting of sodium chloride, potassium chloride, ammonium chloride, sodium bromide, potassium bromide, ammonium bromide, sodium iodide, potassium iodide, ammonium iodide, calcium chloride, magnesium chloride, calcium bromide, magnesium bromide, sodium nitrate, potassium nitrate, ammonium nitrate, sodium sulfate, potassium sulfate, ammonium sulfate, or (iii) both.

10. A method for producing hydrocarbons from a production well utilizing a low-density treatment fluid comprising a base water-control system comprising at least one polymeric material; and at least one light-weight filler material, the method comprising:
introducing the low-density treatment fluid through the production well into at least one pay zone of a subterranean cavity having the at least one pay zone comprising a target fluid, at least one water zone comprising a secondary fluid, and at least one thief zone comprising a secondary fluid, wherein
the at least one water zone is located above the pay zone,
the at least one thief zone comprises a fracture, a fault, or both, and
the at least one thief zone spans the pay zone and the water zone, such that the water zone is connected to the pay zone through the at least one thief zone;
displacing at least a portion of the secondary fluid present in the at least one pay zone with the low-density treatment fluid;
allowing the low-density treatment fluid to accumulate on a top surface of the target fluid, the target fluid having a density that is greater than a density of the low-density treatment fluid and the low-density treatment fluid having a density of from 0.1 g/cm$^3$ to 0.75 g/cm$^3$; and
at least partially plugging the at least one thief zone with the low-density treatment fluid, such that production of the secondary fluid from the at least one water zone through the thief zone to the pay zone is mitigated.

11. The method of claim 10, wherein the low-density treatment fluid comprises less than or equal to 0.5 weight % synthetic silicates.

12. The method of claim 10, wherein the at least one polymeric material comprises a crosslinked water-swellable polymeric material.

13. The method of claim 10, wherein the at least one polymeric material comprises a crosslinkable polymeric system.

14. The method of claim 13, wherein the crosslinkable polymeric system comprises:
a base polymer selected from a copolymer formed from monomers comprising acrylamide or a salt thereof and acrylic acid or a salt thereof, a terpolymer formed from monomers comprising acrylamide or a salt thereof and acrylic acid or a salt thereof, a tetrapolymer formed from monomers comprising acrylamide and acrylic acid, or a mixture of two or more of the copolymer, terpolymer, and tetrapolymer; and
a crosslinker selected from one or more amine-containing compounds selected from a diamine, a triamine, a tetramine, a polyalkylenimine, a polyalkylene polyamine, and a poly-functional aliphatic amine.

15. The method of claim 10, wherein the at least one light-weight filler material comprises a non-deformable, low-density particulate material.

16. The method of claim 10, wherein the at least one light-weight filler material comprises a deformable, low-density particulate material.

17. The method of claim 10, wherein the low-density treatment fluid comprises substantially no synthetic silicates.

* * * * *